United States Patent
Chang

(10) Patent No.: US 10,877,301 B2
(45) Date of Patent: Dec. 29, 2020

(54) PHOTOCHROMIC FILM

(71) Applicant: GM Global Technology Operations LLC, Detroit, MI (US)

(72) Inventor: Kai-Han Chang, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 134 days.

(21) Appl. No.: 15/954,008

(22) Filed: Apr. 16, 2018

(65) Prior Publication Data

US 2019/0317351 A1 Oct. 17, 2019

(51) Int. Cl.
*G02F 1/133* (2006.01)
*G02F 1/1335* (2006.01)
*C09K 19/60* (2006.01)
*B60J 3/04* (2006.01)

(52) U.S. Cl.
CPC ............ *G02F 1/13318* (2013.01); *B60J 3/04* (2013.01); *C09K 19/601* (2013.01); *G02F 1/1335* (2013.01); *G02F 2001/13312* (2013.01); *G02F 2202/043* (2013.01); *G02F 2202/14* (2013.01); *G02F 2202/28* (2013.01)

(58) Field of Classification Search
CPC ............ G02F 1/13318; G02F 1/1335; G02F 2001/13312; G02F 2202/043; G02F 2202/28; G02F 2002/14; G02F 1/13725; G02F 1/0126; B60J 3/04; C09K 2219/13
See application file for complete search history.

(56) References Cited

U.S. PATENT DOCUMENTS

| | | | |
|---|---|---|---|
| 2001/0009721 A1* | 7/2001 | Kawashima | B32B 27/32 428/475.8 |
| 2016/0070132 A1* | 3/2016 | Soto | G02F 1/13725 349/193 |
| 2016/0097236 A1* | 4/2016 | Ko | E06B 9/24 349/16 |
| 2018/0284536 A1* | 10/2018 | Lee | B60J 3/04 |

\* cited by examiner

*Primary Examiner* — Jessica M Merlin
(74) *Attorney, Agent, or Firm* — Quinn IP Law

(57) ABSTRACT

An optical device that is disposed to manage light transmittance therethrough includes a multi-layer photochromic sheet that is composed of a first layer, a second layer, and a photochromic layer interposed therebetween. The photochromic layer is composed of a mixture of dichroic dye and photo-isomerizable material that are disposed in a liquid crystal host, and the first and second layers are each fabricated from a clear polymer.

17 Claims, 3 Drawing Sheets

PHOTOCHROMIC FILM

INTRODUCTION

Incident sunlight can partially or completely obstruct a field of view of an individual, such as a vehicle operator.

SUMMARY

An optical device that is disposed to manage light transmittance therethrough is described, and includes a multi-layer photochromic sheet that is composed of a first layer, a second layer, and a photochromic layer interposed therebetween. The photochromic layer is composed of a mixture of dichroic dye and photo-isomerizable material that are disposed in a liquid crystal host, and the first and second layers are each fabricated from a clear polymer.

An aspect of the disclosure includes the photo-isomerizable material being azobenzene.

Another aspect of the disclosure includes the parametric layer being composed of a mixture of the dichroic dye and the photo-isomerizable material that are suspended in the liquid crystal host.

Another aspect of the disclosure includes the photo-isomerizable material being a film that is disposed on inner surfaces of both the first and second layers.

Another aspect of the disclosure includes a transparent adhesive layer being disposed on an outer surface of the first layer and interposed between the optical device and an adjacent glass pane.

Another aspect of the disclosure includes the first layer being configured as a micro-prismatic array, the micro-prismatic array including a plurality of linearly-disposed microprisms arranged in parallel. Each of the linearly-disposed microprisms has a right-triangular cross-section including a first leg and a second leg that are defined in a second plane that is perpendicular to a first plane defined by the first layer, each of the first legs of the linearly-disposed microprisms defines a first subplane, and each of the second legs of the linearly-disposed microprisms defines a second subplane, and wherein the photo-isomerizable material is disposed on the first subplane associated with the first leg.

Another aspect of the disclosure includes a first electrode disposed on an inner surface of the first layer, a second electrode disposed on an inner surface of the second layer, a light sensor disposed to monitor incident light and operably connected to an electric power source, and the light sensor being disposed to electrically connect the electric power source to the first and second electrodes in response to a detection of incident light that is greater than a threshold magnitude.

Another aspect of the disclosure includes the photo-isomerizable material being in a relaxed, trans, low-energy state when exposed to lightwaves that are less than a threshold intensity level.

Another aspect of the disclosure includes the dichroic dye and the photo-isomerizable materials disposed in the liquid crystal host being disposed in a homeotropic alignment when exposed to lightwaves that are less than the threshold intensity level.

Another aspect of the disclosure includes the photo-isomerizable material being in an excited, cis, high-energy state when exposed to lightwaves that are greater than a threshold intensity.

Another aspect of the disclosure includes the dichroic dye and the photo-isomerizable materials disposed in the liquid crystal host being disposed in a non-homeotropic alignment when exposed to lightwaves that are greater than the threshold intensity level.

Another aspect of the disclosure includes an optical device disposed to manage light transmittance therethrough, including a multi-layer photochromic sheet composed of a first layer, a second layer, and a photochromic layer interposed therebetween, a first electrode disposed on an inner surface of the first layer, a second electrode disposed on an inner surface of the second layer, and a light sensor disposed to monitor incident light and operably connected to an electric power source. The photochromic layer is composed of a dichroic dye that is disposed in a liquid crystal host, and the light sensor is disposed to electrically connect the electric power source to the first and second electrodes in response to a detection of incident light that is greater than a threshold magnitude. Transmittance of the photochromic layer decreases in response to the electrical connection of the electric power source to the first and second electrodes.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, including as follows.

FIGS. 2-1 and 2-2 graphically depict a molecular chain for a single element of an embodiment of a photo-isomerizable material, including a depiction of the molecular chain for the single element in an unexcited state at a low light intensity state (FIG. 2-1) and a depiction of the molecular chain for the single element in an excited state at a high light intensity state (FIG. 2-2), in accordance with the disclosure.

FIGS. 3-1 and 3-2 schematically show cross-sectional side views of a portion of a first embodiment of the optical device, including a multi-layer photochromic sheet that is composed of a first transparent layer, a second transparent layer, and a photochromic layer, including a depiction of the photochromic layer in an unexcited state (FIG. 3-1) and in a depiction of the photochromic layer in an excited state (FIG. 3-2), in accordance with the disclosure.

FIGS. 4-1 and 4-2 schematically show cross-sectional side views of a portion of a second embodiment of the optical device, including the multi-layer photochromic sheet that is composed of the first transparent layer, the second transparent layer, and the photochromic layer, wherein the photo-isomerizable material is applied as a film on inner surfaces of both of the first and second transparent layers, including a depiction of the photochromic layer in an unexcited state (FIG. 4-1) and a depiction of the photochromic layer in an excited state (FIG. 4-2), in accordance with the disclosure.

FIG. 6-1 schematically shows a side view of another embodiment of the optical device disposed on a transparent glass pane in the form of a windscreen for a vehicle, including a light intensity sensor, in accordance with the disclosure.

FIGS. 6-2 and 6-3 schematically show cross-sectional side views of a portion of the embodiment of the optical device, the light intensity sensor and a AC power source, including a depiction of a photochromic layer of the optical device in a deactivated state (FIG. 6-2) and a depiction of the photochromic layer in an activated state (FIG. 6-3), in accordance with the disclosure.

Figure 1:
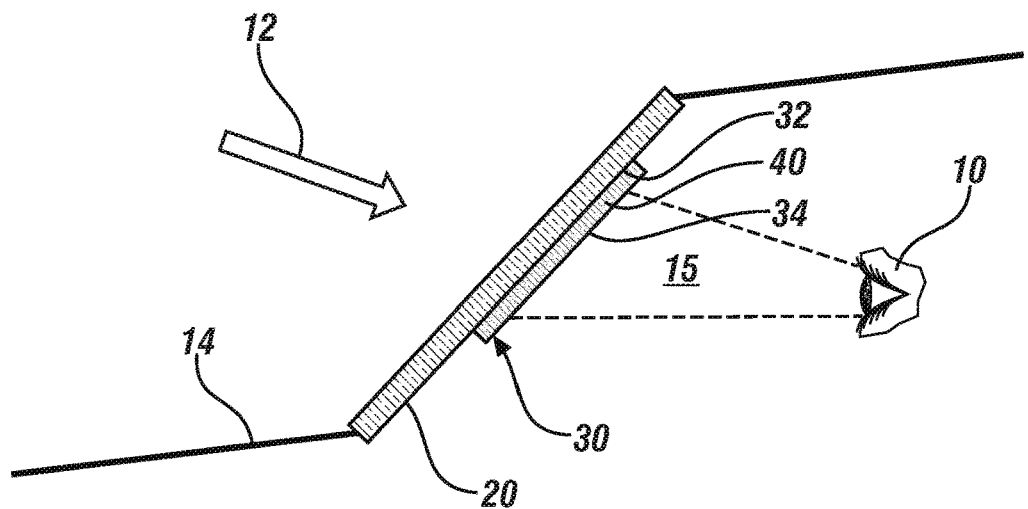
FIG. 1 schematically shows a side view of an optical device that is disposed on a transparent glass pane to manage light transmittance, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Like reference numerals correspond to like or similar components throughout the several Figures.

The concepts described herein relate to an optical device that changes optical characteristics depending upon intensity of incident light. FIG. 1 schematically shows a side view of an optical device 30 that is disposed on a transparent glass pane 20. The optical device 30 may be advantageously interposed between a field of view 15 for an operator 10 and incident light 12 to automatically variably adjust the transmittance of the incident light 12 in a manner that is responsive to the intensity of the incident light 12. Specifically, the optical device 30 can reduce the transmittance of the incident light 12 through the glass pane 20 into the field of view 15 of the operator 10 when the intensity of the incident light 12 is greater than a threshold level. Furthermore, the variable adjustment of the transmittance of the incident light 12 is completely reversible in response to a subsequent reduction in the intensity of the incident light 12. In one non-limiting embodiment, and as described herein, the operator 10 may be a vehicle operator, the glass pane 20 may be a windscreen for a vehicle 14, the source of the incident light 12 may be the sun, and the optical device 30 may be disposed to manage transmittance of the incident light 12 through the windscreen, i.e., the glass pane 20 into the field of view 15 of the operator 10.

The optical device 30 includes a multi-layer photochromic sheet that is composed of a first transparent layer 32, a second transparent layer 34, and a photochromic layer 40 that is interposed therebetween. In one embodiment, the photochromic layer 40 is composed of a mixture of dichroic dye and photo-isomerizable material that are disposed in a liquid crystal host. In one embodiment and as shown, the first transparent layer 32 and the second transparent layer 34 are fabricated from an optically clear polymer material. Alternatively, the first transparent layer 32 and the second transparent layer 34 may be fabricated from another material, including material that includes color tinting. The optical device 30 may be attached onto the glass pane 20 employing a clear adhesive material, static electricity, or another reversible bonding material or method. The optical device consumes zero or minimal electric power and complies with SAE windshield standard with designed parameters. The optical device 30 can also be applied on other glass surfaces, e.g., a reflective mirror for glare reduction.

Figures 1, 2:
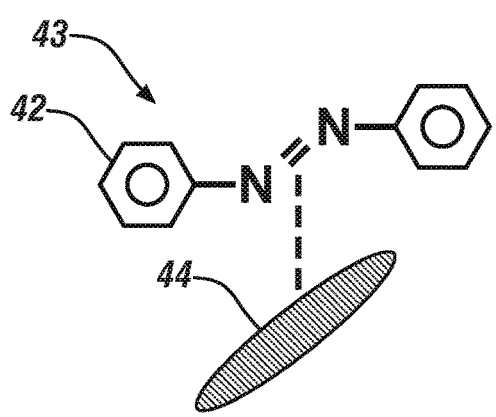
Figure 2:
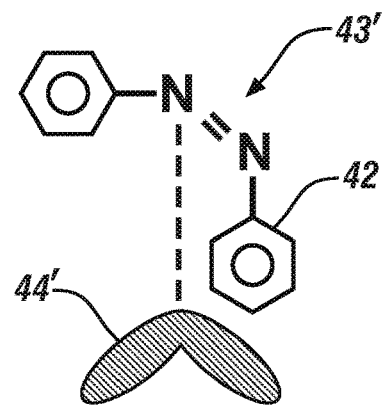

FIGS. 2-1 and 2-2 graphically depict a single molecular chain 43 for a single element of an embodiment of the photo-isomerizable material 42 of the photochromic layer 40, and an associated visual depiction 44 of the photo-isomerizable material 42. FIG. 2-1 shows the single molecule 43 in the form of an azobenzene moiety for the photo-isomerizable material 42, and the associated visual depiction 44 in an unexcited state, i.e., when exposed to low light intensities. The single molecule 43 includes a double-bonded nitrogen (N) link and two benzene rings. As indicated, the single molecule 43 is substantially straight, and the visual depiction 44 has an elongated shape. The photo-isomerizable material 42 does not act to obstruct incident light 12 when in the unexcited state. The obstruction of the incident light 12, i.e., reduction in light transmittance, is caused by a change in orientation of the dichroic dye (shown, e.g., in FIGS. 3-1 and 3-2), such as may be caused by a light-induced change in the photo-isomerizable material 42.

FIG. 2-2 shows the single molecule 43' for the single element of the photo-isomerizable material 42 and the associated visual depiction 44' in an excited state, i.e., when exposed to light intensities that are greater than a threshold light intensity. As indicated, the single molecule 43' takes on a bent appearance, and the visual depiction 44' takes on a bent shape. The photo-isomerizable material 42 will act to obstruct incident light when in the excited state. The light intensity acts as a switch for the shape change of the photo-isomerizable material 42. The magnitude of bend in a single molecule is not proportional to the light intensity. Instead, the magnitude of the light intensity will determine the portion of the photo-isomerizable materials 42 in the liquid crystal host that are in the bent shape. As the ratio increases with the light intensity, the magnitude of the obstruction effect increases. As such, there may be some portion of the photo-isomerizable materials 42 in the liquid crystal host that are in the bent shape and associated light obstruction at minimally increased light intensities as compared to a baseline level, and the portion of the photo-isomerizable materials 42 in the liquid crystal host that are in the bent shape increases with increased light intensity, thus increasing the magnitude of the obstruction effect, i.e., reducing the light transmittance.

Figures 1, 3:
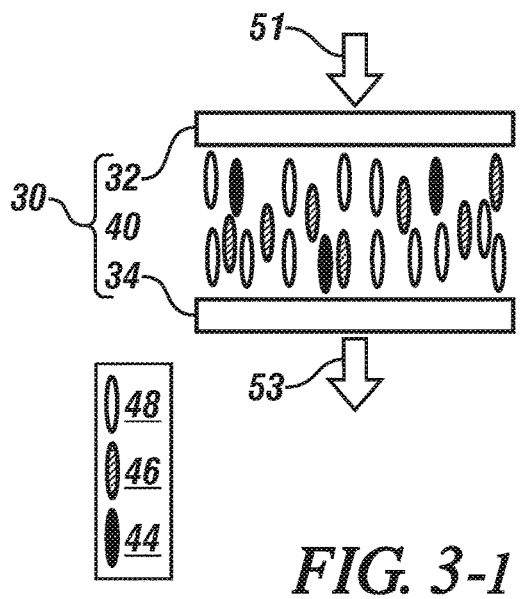
Figures 2, 3:
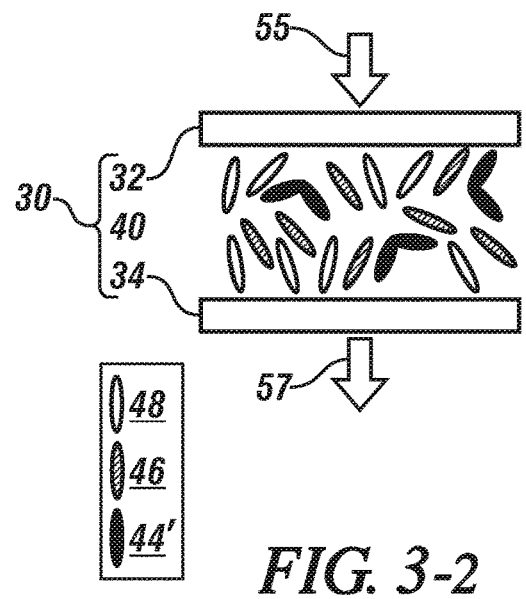

FIGS. 3-1 and 3-2 schematically show cross-sectional side views of a portion of a first embodiment of the optical device 30, including the multi-layer photochromic sheet that is composed of the first transparent layer 32, the second transparent layer 34, and the photochromic layer 40. The photochromic layer 40 is composed of a mixture of the photo-isomerizable material 42, which is visually depicted as element 44, a rod-shaped dichroic dye, which is depicted as element 46, both of which are suspended in a liquid crystal host, which is depicted as element 48. The photo-isomerizable material 44 includes azobenzene moiety in one embodiment. The photo-isomerizable material 44 is in a relaxed, trans, low-energy state when exposed to lightwaves that are less than a threshold intensity level, which renders them in a homeotropic alignment, as depicted with reference to FIG. 3-1. The photo-isomerizable material 44 is in an excited, cis, high-energy state when exposed to lightwaves that are greater than a threshold intensity, which renders them in a non-homeotropic alignment when exposed to lightwaves that are greater than the threshold intensity level, as depicted with reference to FIG. 3-2. When the lightwaves are in the non-homeotropic alignment, they interfere with and move the rod-shaped dichroic dye 46, causing the rod-shaped dichroic dye 46 to tint the incident light 12.

FIG. 3-1 also depicts the light intensities, including a first, low level ambient light intensity 51 and an associated in-vehicle light intensity 53 after having passed through the optical device 30 with the photo-isomerizable material 44 in the unexcited state. As depicted, the magnitude of the in-vehicle light intensity 53 is the same as the low level ambient light intensity 51. The photo-isomerizable material 44 and the rod-shaped dichroic dye 46 are oriented in parallel with an axis defined by the trajectory of the incident light 12, and thus do not obstruct the incident light 12.

FIG. 3-2 also depicts the light intensities, including a second, high level ambient light intensity 55 and an associated in-vehicle light intensity 57 after having passed through the optical device 30 with the photo-isomerizable material 42 in the excited state. As depicted, the magnitude of the in-vehicle light intensity 57 is reduced in comparison with the low level ambient light intensity 51. The change in the photo-isomerizable material 42 causes a change in the orientation of the rod-shaped dichroic dye 46, thus causing the dichroic dye 46 to obstruct the incident light 12.

Figures 1, 4:
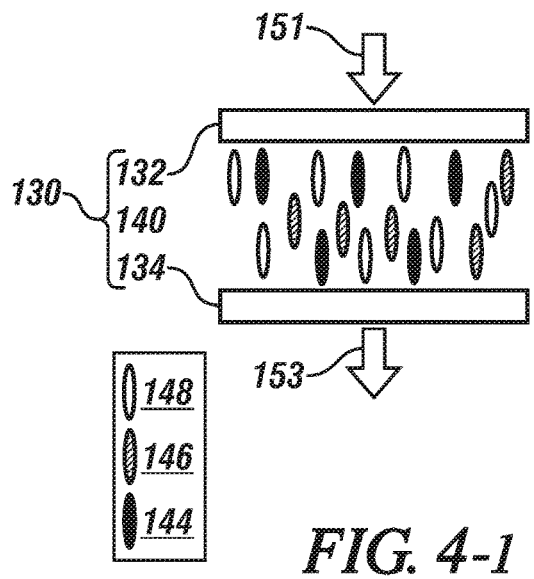
Figures 2, 4:
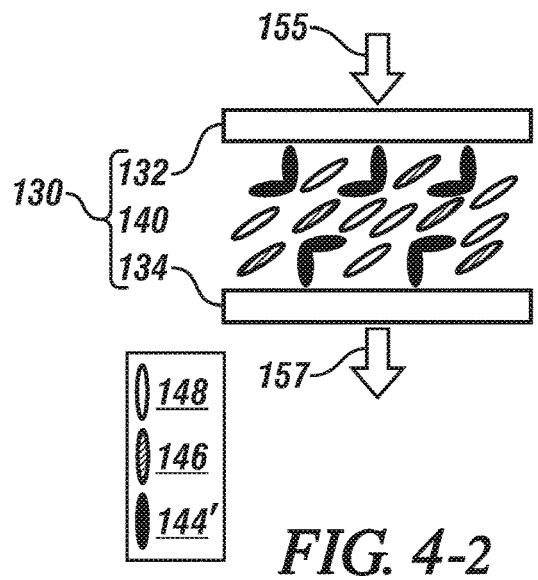

FIGS. 4-1 and 4-2 schematically show cross-sectional side views of a portion of a second embodiment of the optical device 130, including the multi-layer photochromic sheet that is composed of the first transparent layer 132, the second transparent layer 134, and the photochromic layer 140. The photochromic layer 140 is composed of the photo-isomerizable material, which is depicted as element 144, the rod-shaped dichroic dye, which is depicted as element 146, and the liquid crystal host, which is depicted as element 148. In this embodiment, the photo-isomerizable material 144 is applied as a film that is disposed on inner surfaces of both of the first and second transparent layers 132, 134, and the rod-shaped dichroic dye 146 is suspended in the liquid crystal host 148.

FIG. 4-1 also depicts the light intensities, including a first, low level ambient light intensity 151 and an associated in-vehicle light intensity 153 after having passed through the optical device 130 with the photo-isomerizable material 144 in the unexcited state. As depicted, the magnitude of the in-vehicle light intensity 153 is the same as the low level ambient light intensity 151.

FIG. 4-2 also depicts the light intensities, including a second, high level ambient light intensity 155 and an associated in-vehicle light intensity 157 after having passed through the optical device 30 with the photo-isomerizable material 144 in the excited state. As depicted, the magnitude of the in-vehicle light intensity 157 is reduced in comparison with the low level ambient light intensity 151 because the change in the photo-isomerizable material 144 causes a change in the orientation of the rod-shaped dichroic dye 146, thus causing the dichroic dye 146 to obstruct incident light.

Figure 5:
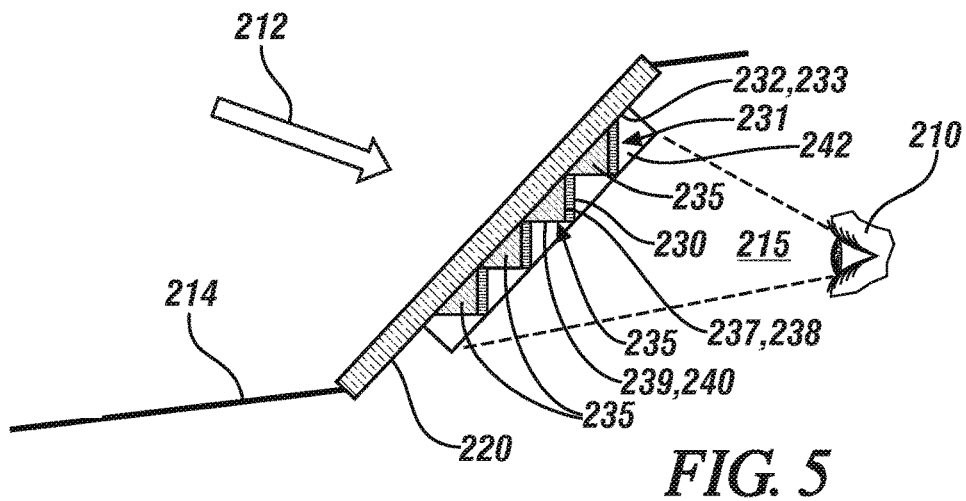
FIG. 5 schematically shows a side view of another embodiment of the optical device disposed on a transparent glass pane, wherein the optical device is configured as a micro-prismatic array having the multi-layer photochromic sheet disposed on a portion thereof, in accordance with the disclosure.

FIG. 5 schematically shows a side view of another embodiment of the optical device 230 disposed on transparent glass pane 220, which may be disposed as a windscreen on a vehicle 214 in one embodiment. The optical device 230 is disposed on the transparent glass pane 220 and may be advantageously interposed between a first field of view 215 for an operator 210 and incident light 212, wherein the first field of view 215 projects outwardly forward from the vehicle 214. In this embodiment, the optical device 230 is configured as a micro-prismatic array 231 that may be disposed on an inner surface of a first layer 232, which defines a first planar surface 233. The micro-prismatic array 231 includes a plurality of linearly-disposed microprisms 235 that are arranged in parallel. In one embodiment, the microprisms 235 can range in width from greater than 100 micrometers to less than 1 centimeter, and extend across the glass pane 220 horizontally. Each of the linearly-disposed microprisms 235 has a right-triangular cross-section including a first leg 237 and a second leg 239 that are defined in a second plane that is orthogonal to the first planar surface 233 that is defined by the first layer 232, and is represented by the side view as shown in this Figure. Each of the first legs 237 of the linearly-disposed microprisms 235 defines a first subplane 238, and each of the second legs 239 of the linearly-disposed microprisms 235 defines a second subplane 240, wherein the first and second subplanes 238, 240 are orthogonal to each other. The optical device 230 is disposed on the first subplane 238 that is defined on the first leg 237, and is in the form of an embodiment of the multi-layer photochromic sheet that is composed of the first transparent layer 232, the second transparent layer 234, and the photochromic layer 240, as is described herein. The prismatic surface 231 may be coated with a composite substance 242 for smoothing the surface and to protect against scratching. The optical device 230 operates in the manner described herein to obstruct the transmittance of incident light 212 in the presence of high intensity of the incident light 212.

Figures 1, 6:
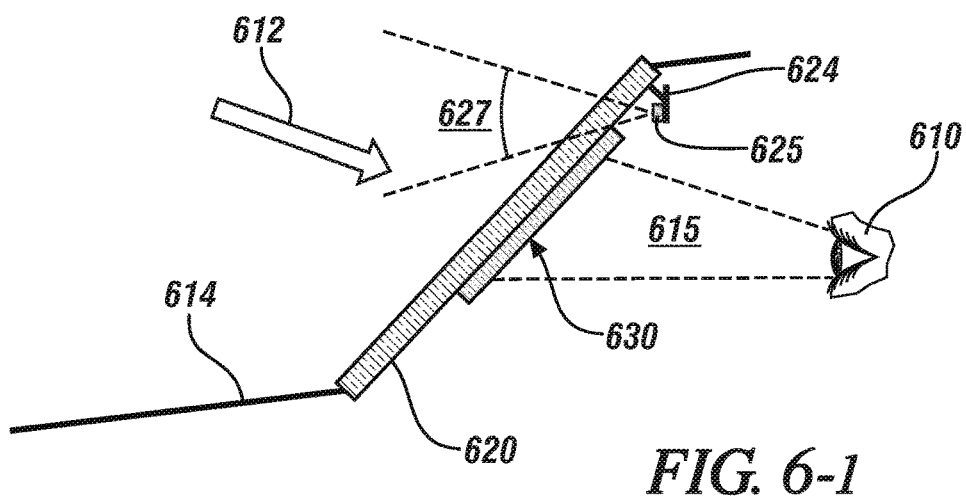
Figures 2, 6:
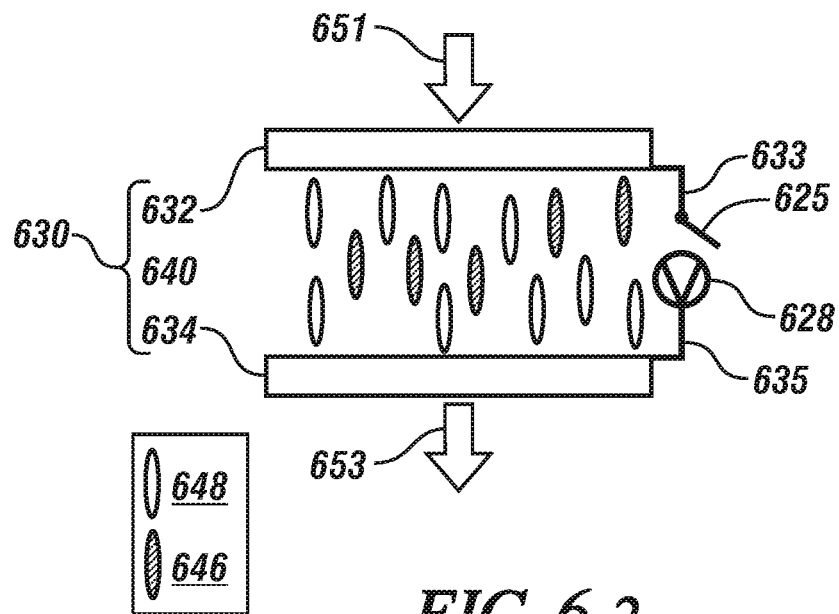
Figures 3, 6:
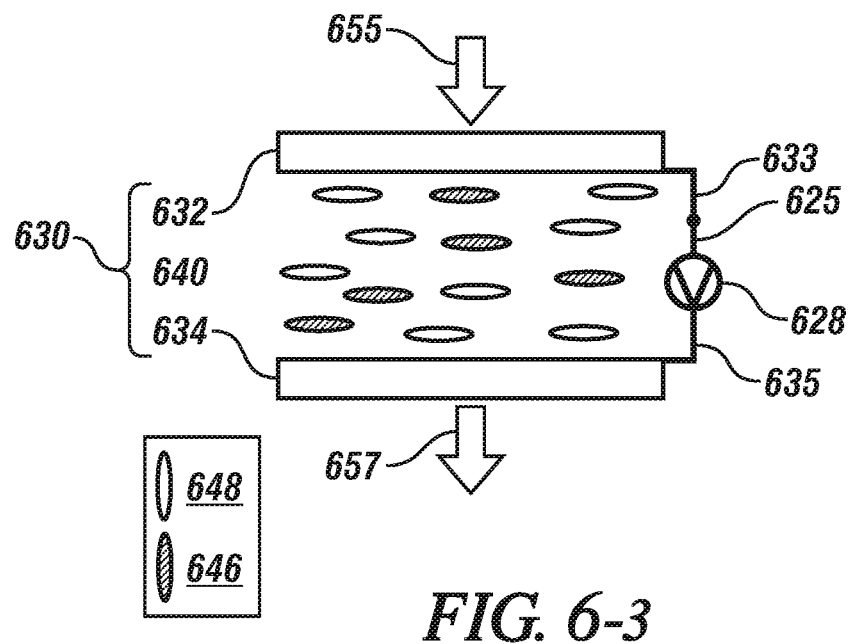

FIG. 6-1 schematically shows a side view of another embodiment of the optical device 630 that is disposed on a transparent glass pane 620, which is a windscreen for a vehicle 614 in one embodiment. The optical device 630 is disposed on the transparent glass pane 620 and may be advantageously interposed between a first field of view 615 for an operator 610 and incident light 612, wherein the first field of view 615 projects outwardly forward from the vehicle 614. The vehicle (not shown) also includes a rear-view mirror 624 that is mounted on or near a center portion of the glass pane 620. The rear-view mirror 624 includes a light intensity sensor 625 having a second field of view 627 that also projects outwardly forward from the vehicle 614 and overlaps the first field of view 615.

The light intensity sensor 625 is advantageously positioned so that the second field of view 627 includes direct sunlight that is low on the horizon, i.e., at less than a predetermined, calibratable angle that is defined in relation to the horizon and the orientation of the vehicle 614. As such the light intensity sensor 625 is disposed to sense direct incident light 612 when it is below a threshold angle of incidence that can be related to reduced visibility in the passenger compartment of the vehicle 614. Such exposure can include the vehicle 614 having a westward orientation at or near sunset during late afternoon or early evening hours, and also include the vehicle 614 having an eastward orientation at or near sunrise during morning hours. The light intensity sensor 625 is configured as a CMOS device or another solid-state electronic sensing and switching device that is selectively activated in presence of incident light 612 that is of an intensity that is greater than a threshold intensity, which is calibratable.

The light intensity sensor 625 is in communication with the optical device 630, either directly or via an electric circuit (not shown). In one embodiment, the light intensity sensor 625 is configured to electrically connect a low-voltage AC power source 628 (shown in FIGS. 6-2 and 6-3) to the optical device 630 to activate the optical device 630 when the direct incident light 612 sensed by the light intensity sensor 625 is greater than a threshold level.

Activating the optical device 630 can include controlling, via the light intensity sensor 625, electric power flow from the AC power source 628 to the optical device 630 when the direct incident light 612 sensed by the light intensity sensor 625 is greater than the threshold level.

In one embodiment, the light intensity sensor 625 may include a solar cell that is capable of generating electric power in presence of direct sunlight, and employing such solar energy to power the optical device 630 as a substitute for or as a supplement to the electric power from the AC power source 628.

FIGS. 6-2 and 6-3 schematically show cross-sectional side views of a portion of another embodiment of the optical device 630, including the multi-layer photochromic sheet that is composed of the first transparent layer 632, the second transparent layer 634, and the photochromic layer 640. The first transparent layer 632 includes a first electrode 633, which is disposed as a two-dimensional array across the planar surface thereof. Likewise, the second transparent layer 634 includes a second electrode 635 that is disposed as a two-dimensional array across the planar surface thereof. Alternatively, the first and second electrodes 633, 635 may be another suitable electrode configuration. The first and second electrodes 633, 635 electrically connect to opposite ends of the light intensity sensor 625, with the AC power source 628 interposed. As such, when the light intensity sensor 625 is activated by sensed incident light 612, a closed electric circuit is generated that includes the AC power source 628, the first and second electrodes 633, 635 and the photochromic layer 640 of the optical device 630. When the light intensity sensor 625 is deactivated by absence of incident light 612, the AC power source 628 is disconnected from one or both of the first and second electrodes 633, 635 of the optical device 630. The photochromic layer 640 is composed of the rod-shaped dichroic dye, which is depicted as element 646 and the liquid crystal host, which is depicted as element 648. In this embodiment, the rod-shaped dichroic dye 646 is suspended in the liquid crystal host 648.

FIG. 6-2 depicts orientations of the rod-shaped dichroic dye 646 suspended in the liquid crystal host 648 when the AC power source 628 is disconnected from the first and second electrodes 633, 635 of the optical device 630. When the AC power source 628 is disconnected, the rod-shaped dichroic dye 646 and the liquid crystal host 648 auto-arrange in a first, non-obstructing orientation. The light intensities, including a first, low level ambient light intensity 651 and an associated in-vehicle light intensity 653 after having passed through the optical device 630 in the unactivated state are also depicted, representing when the AC power source 628 is disconnected from the first and second electrodes 633, 635 of the optical device 630. As depicted, the magnitude of the in-vehicle light intensity 653 is the same as the low level ambient light intensity 651.

FIG. 6-3 depicts orientations of the rod-shaped dichroic dye 646 suspended in the liquid crystal host 648 when the AC power source 628 is connected to the first and second electrodes 633, 635 of the optical device 630. When the AC power source 628 is connected, the rod-shaped dichroic dye 646 and the liquid crystal host 648 change orientation to a second, light obstructing orientation in response. The associated light intensities, including a second, high level ambient light intensity 655 and an associated in-vehicle light intensity 657 after having passed through the optical device 630 in the activated state are also depicted, representing when the AC power source 628 is connected to the first and second electrodes 633, 635 of the optical device 630. As depicted, the magnitude of the in-vehicle light intensity 657 is reduced in comparison with the low level ambient light intensity 655.

The concepts described herein, when applied onto a windscreen for a vehicle, can provide a sunlight-adaptable dimming film that improves vehicle operator vision during low sun conditions by automatically reducing light transmittance at low sun condition.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An optical device disposed to manage light transmittance therethrough, comprising:
    a multi-layer photochromic sheet composed of a first layer, a second layer, and a photochromic layer interposed therebetween;
    wherein the first and second layers are fabricated from a clear polymer material;
    wherein the photochromic layer is composed of a dichroic dye and a photo-isomerizable material that are disposed in a liquid crystal host;
    wherein the photo-isomerizable material is in a relaxed, trans, low-energy state when exposed to lightwaves that are less than a threshold intensity level, and
    wherein the dichroic dye and the photo-isomerizable materials disposed in the liquid crystal host are disposed in a homeotropic alignment when exposed to lightwaves that are less than the threshold intensity level.

2. The optical device of claim 1, wherein the photo-isomerizable material comprises an azobenzene moiety.

3. The optical device of claim 1, wherein the photochromic layer is composed of a mixture of the dichroic dye and the photo-isomerizable material that are suspended in the liquid crystal host.

4. The optical device of claim 1, wherein the photo-isomerizable material comprises a film that is disposed on inner surfaces of both the first and second layers.

5. The optical device of claim 1, further comprising a transparent adhesive layer disposed on an outer surface of the first layer and interposed between the outer surface of the first layer of the optical device and an adjacent glass pane.

6. The optical device of claim 1, wherein the first layer is configured as a micro-prismatic array, the micro-prismatic array including a plurality of linearly-disposed microprisms arranged in parallel with each other; wherein each of the linearly-disposed microprisms has a right-triangular cross-section including a first leg and a second leg that are defined in a second plane that is perpendicular to a first plane defined by the first layer;

wherein each of the first legs of the linearly-disposed microprisms defines a first subplane, and wherein each of the second legs of the linearly-disposed microprisms defines a second subplane, and wherein the photo-isomerizable material is disposed on the first subplane associated with the first leg.

7. The optical device of claim 1, wherein the photo-isomerizable material is in an excited, cis, high-energy state when exposed to lightwaves that are greater than a threshold intensity level.

8. The optical device of claim 7, wherein the dichroic dye and the photo-isomerizable materials disposed in the liquid crystal host are disposed in a non-homeotropic alignment when exposed to lightwaves that are greater than the threshold intensity level.

9. An optical device disposed on a windscreen, comprising:
    a multi-layer photochromic sheet composed of a first layer, a second layer, and a photochromic layer interposed therebetween;
    wherein the photochromic layer includes a dichroic dye and a photo-isomerizable material that are disposed in a liquid crystal host; and
    wherein the optical device is disposed on the windscreen to manage light transmittance therethrough;
    wherein the photo-isomerizable material is in an excited, cis, high-energy state when exposed to lightwaves that are greater than a threshold intensity, and wherein the dichroic dye and the photo-isomerizable materials disposed in the liquid crystal host are disposed in a non-homeotropic alignment when exposed to lightwaves that are greater than a threshold intensity level.

10. The optical device of claim 9, wherein the photo-isomerizable material comprises an azobenzene moiety.

11. The optical device of claim 9, wherein the photochromic layer is composed of a mixture of the dichroic dye and the photo-isomerizable material that are suspended in the liquid crystal host.

12. The optical device of claim 9, wherein the photo-isomerizable material comprises a film that is disposed on inner surfaces of both the first and second layers.

13. The optical device of claim 9, further comprising a transparent adhesive layer disposed on an outer surface of the first layer and interposed between the outer surface of the first layer of the optical device and an adjacent glass pane.

14. The optical device of claim 9, wherein the first layer is configured as a micro-prismatic array, the micro-prismatic array including a plurality of linearly-disposed microprisms arranged in parallel with each other, and wherein the photo-isomerizable material is disposed on a subplane of each of the linearly-disposed microprisms.

15. The optical device of claim 14, wherein each of the linearly-disposed microprisms has a right-triangular cross-section including a first leg and a second leg that are defined in a second plane that is perpendicular to a first plane defined by the first layer;

wherein each of the first legs of the linearly-disposed microprisms defines a first subplane, and wherein each of the second legs of the linearly-disposed microprisms defines a second subplane, and wherein the photo-isomerizable material is disposed on the first subplane associated with the first leg.

16. The optical device of claim 9, wherein the photo-isomerizable material is in a relaxed, trans, low-energy state when exposed to lightwaves that are less than a threshold intensity level, and wherein the dichroic dye and the photo-isomerizable materials disposed in the liquid crystal host are disposed in a homeotropic alignment when exposed to lightwaves that are less than a threshold intensity level.

17. An optical device disposed to manage light transmittance therethrough, comprising:
    a multi-layer photochromic sheet composed of a first layer, a second layer, and a photochromic layer interposed therebetween;
    a first electrode disposed on an inner surface of the first layer;
    a second electrode disposed on an inner surface of the second layer; and
    a light sensor disposed to monitor incident light and operably connected to an electric power source;
    wherein the photochromic layer is composed of a dichroic dye and a photo-isomerizable material that are disposed in a liquid crystal host;
    wherein the light sensor is disposed to electrically connect the electric power source to the first and second electrodes in response to a detection of incident light that is greater than a threshold magnitude;
    wherein transmittance of the photochromic layer decreases in response to the electrical connection of the electric power source to the first and second electrodes;
    wherein the photo-isomerizable material is in a relaxed, trans, low-energy state when exposed to lightwaves that are less than a threshold intensity level, and
    wherein the dichroic dye and the photo-isomerizable materials disposed in the liquid crystal host are disposed in a homeotropic alignment when exposed to lightwaves that are less than the threshold intensity level; and
    wherein the photo-isomerizable material is in an excited, cis, high-energy state when exposed to lightwaves that are greater than a threshold intensity, and wherein the dichroic dye and the photo-isomerizable materials disposed in the liquid crystal host are disposed in a non-homeotropic alignment when exposed to lightwaves that are greater than a threshold intensity level.

* * * * *